Dec. 20, 1955          A. MOEN          2,727,405
BRAKE PEDAL LATCHING MECHANISM
Filed Feb. 29, 1952          2 Sheets—Sheet 1
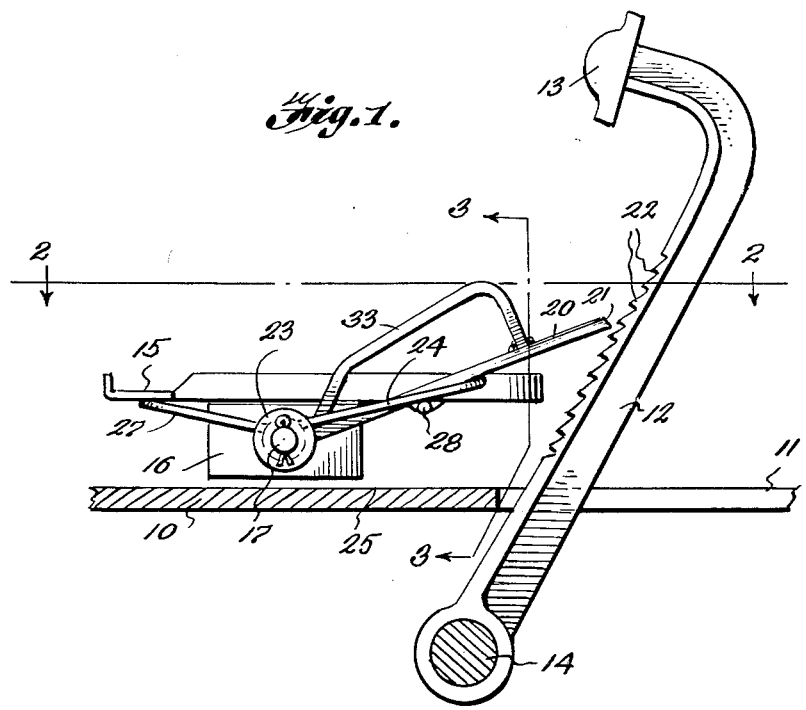
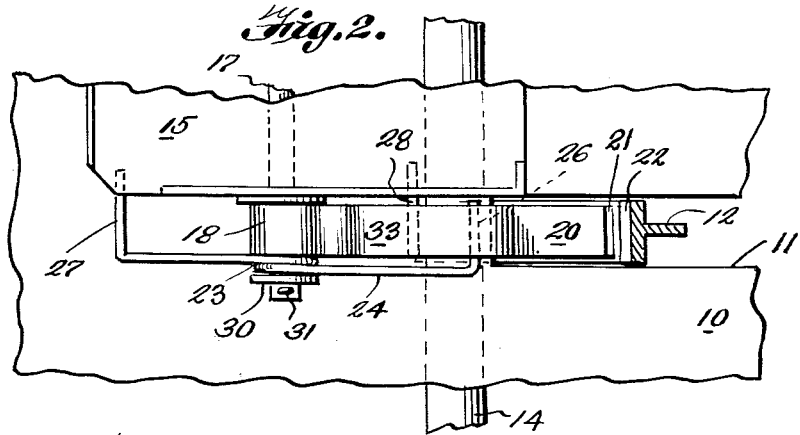
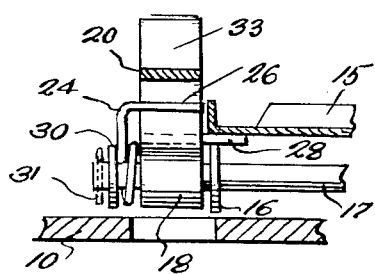
INVENTOR.
ANSEL MOEN
BY
Ralph L. Stevens
ATTORNEY

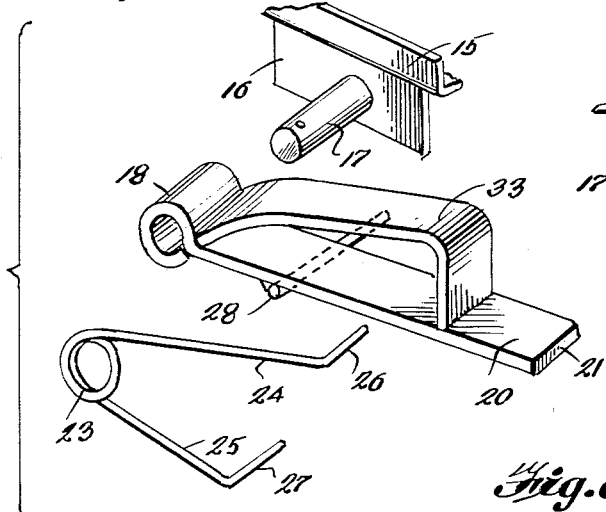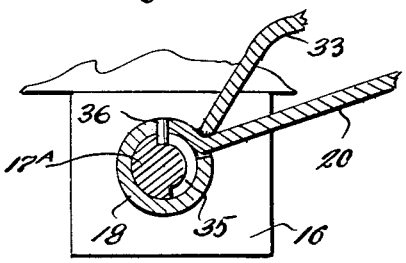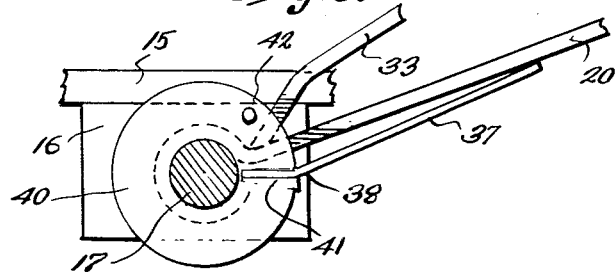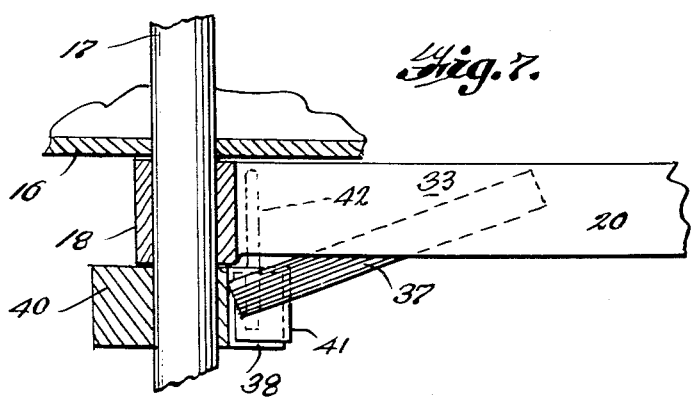

2,727,405

BRAKE PEDAL LATCHING MECHANISM

Ansel Moen, Arlington, S. Dak.

Application February 29, 1952, Serial No. 274,258

10 Claims. (Cl. 74—540)

This invention relates to latching mechanisms for vehicle braking systems, especially those of the pedal actuated type.

More particularly, the present invention is concerned with improvements in means for conveniently latching and releasing foot-operated brake levers such as are used on tractors and other automotive vehicles.

It is the general object of this invention to provide, in a braking system of the class mentioned, an improved mechanism that is sturdy and compact, that can be readily locked in brake-set position by the foot with which the brake is applied and that is easily releasable by properly manipulating the same foot.

Another important object is to devise a brake latching mechanism that can be cheaply supplied and readily incorporated as equipment for existing commercial vehicles. For example, in U. S. Patent No. 1,416,338, there is disclosed a pivoted pawl cooperable with a brake pedal but requiring use of the operator's hand as well as his foot to obtain such cooperation. My invention contemplates the provision of a device that may be simply substituted for this patented pawl, at present in commercial use.

It is a further object of this invention to construct a highly useful heel-controlled adjunct to a pawl that cooperates with a rack of a foot-operated brake lever.

Still further objects are to devise improved spring adjustments for retracting a brake latching pawl from its locked position; and in this connection to devise an improved stop arrangement for limiting movement of the pawl away from the brake pedal.

The foregoing and other objects of the invention should clearly appear from a study of the following description when taken in conjunction with the accompanying drawings, wherein:

Fig. 1 is a side elevational view of a preferred form of the present invention as applied to the foot board or plate of a conventional tractor.

Fig. 2 is a view in partial section, looking downwardly upon the plane of line 2—2, Fig. 1.

Fig. 3 represents a substantially vertical cross section taken along line 3—3, Fig. 1.

Fig. 4 is an "exploded" view in perspective of the attachment parts and their mounting means.

Fig. 5 represents a vertical section through a modified form of connection between the pawl hub and its supporting shaft, a pin and groove being substituted here for the stop means of Figs. 1–4.

Fig. 6 is a fragmentary view of a further modification, wherein a leaf type retracting spring is utilized.

Fig. 7 is a top plan view of Fig. 6, partially in section along an irregular line and with the invisible stop pin seen in phantom outline.

With continued reference to the drawings, and with particular reference first to Figs. 1–4, there is illustrated for example, a conventional floor board or plate 10 mounted below and forwardly of the driver's seat (not shown) and provided with the usual slot 11 for permitting oscillation of a brake lever 12 that has a foot pad 13. The lever is secured to a shaft 14 for actuating the brake mechanism. In the position shown in Fig. 1 the lever is retracted, and when shoved forwardly from this position it sets or tightens the brakes. In many instances the board 10 can be omitted. For example, some farm tractors carry no such structure.

Stationarily mounted on the vehicle is a foot rest 15 having secured or integrally joined thereto at least one depending metal bracket 16 through which horizontally extends a small transverse shaft 17. Mounted for oscillation upon the exposed end of this shaft is a hub 18 that forms an integral part of a latching pawl plate 20. The forward end of the plate 20 preferably is beveled at 21 so that it can substantially fit between any pair of adjoined teeth 22 that form a rack integral with the lever 12.

To prevent the pawl from normally engaging the rack teeth, a biasing wire spring is provided. It has a coil 23 surrounding the shaft 17 and having integral legs 24, 25 that can be spread considerably to wind up the coil. Leg 24 has an offset arm 26 engaging the bottom of the pawl plate, and the other leg has a similar arm 27 in engagement with the bottom of plate 15; the tendency thus being for the spring to unwind and swing the pawl unit rearwardly out of contact with the rack. This rearward movement is limited by a stop rod 28 welded to or otherwise provided on the plate 20 for abutment against the bottom of foot rest 15, in which position (see Fig. 1) the pawl is elevated just high enough to permit complete release of the brakes.

The spring coil 23 may be held in position on its shaft by means of a washer 30 and a pin 31. When a floor board 10 is present, the coil may be tensioned in such manner that leg 27 presses against the floor.

For maximum convenience in locking the latch, when the pedal has been pushed forwardly by the toes or ball of the foot to set the brakes, the pawl plate is equipped with special elevated actuator 33 that may be operated readily by the heel of the shoe. This actuator may take the form of a flat bar that has been bent to have its ends curved downwardly toward the hub and the forward end of the plate, respectively, for welded interconnection. Of course, the actuator may be formed or attached in other ways, the principal requirement being that its operating surface be inclined smoothly upwardly toward the pedal to facilitate accurate and natural movements of the toe and heel of the shoe when it is desired to sequentially set the brakes and lock the latch.

The operation now should be fairly obvious from the above running description. Briefly, assuming, as in Fig. 1, the brakes are unlocked, and the pedal is in its rearmost position as permitted by the spring-retracted pawl plate 20, and it is desired to set the brakes and leave the vehicle (e. g., a tractor) on an incline, the operation is simple, as follows: Shift the foot from the plate 15 and push the pad 13 forwardly with the shoe toe as far as it will move; then swing the heel over to the arch 33 and slide it smoothly in a forward direction while simultaneously depressing it to cause the pawl edge 21 to engage an appropriate portion of the set of teeth 22. To permit the vehicle to move again, it only is necessary to push hard against the pad 13, thus allowing the pawl plate 20 to swing rearwardly, under influence of the tensioned spring. All of this is semi-automatic, no hand manipulation being required; and the operation is performed quite naturally, with but little effort.

In the modification shown in Fig. 5, the rod 28 is eliminated. In its stead, for stopping rearward oscillation of the pawl plate 20, the shaft 17 (here 17A) is provided with a partial circumferential groove 35, which slidably receives one end of a pin 36 that is fixedly set into the hub 18. In this instance of course, in order to limit rearward oscillation of the plate 20, the shaft must be stationary. This also is true in the further modified form shown in Figs. 6 and 7, constructed as follows:

In Figs. 6 and 7, a leaf spring 37 is substituted; one end of the same being engaged with the bottom of the pawl plate 20, and the other being set into a substantially radial slot 38 formed in a collar 40 that is non-rotatably secured (as e. g., by welding or brazing) to the stationary shaft 17. The leaf spring is held in its inclined position, as seen in Fig. 7, by a wedge 41 driven tightly into the slot 38.

The spring 37 normally tends to be approximately straight and hence urges the plate 20 toward its retracted position. Rearward movement of the plate is limited by a stop pin 42 that is set into the collar 40 and projects laterally therefrom into the path of the plate so that the latter may oscillate enough in a counterclockwise direction to permit release of the brakes. This pin 42 is shown in phantom outline in Fig. 7.

It should be understood that the drawings are illustrative, and that the invention may be modified in some respects without departing from its spirit. Therefore, I wish to be limited, as is customary, only by a reasonably liberal interpretation of the appended claims.

What I claim is:

1. In combination with a foot-operable lever carrying a tooth structure, a latching mechanism disposed behind said lever and designed for convenient actuation by the heel of a foot, said mechanism comprising: an oscillatable pawl complemental to said tooth structure; a stationary pivotal shaft upon which said pawl is mounted; spring means normally urging said pawl to a retracted position; and an integral, upwardly inclined heel-operable means on said pawl for forcing the latter into engagement with said tooth structure after the lever has been pushed to its forward position.

2. In claim 1, said pawl being mounted at its rear end upon said stationary pivotal shaft, and said spring means also being mounted on said shaft.

3. In claim 2, there being a fixed and stationary abutment surface adjacent said pawl, and said spring means comprising a tensioned coil of wire having a pair of legs engaged respectively with said pawl and said surface.

4. In combination with a foot-operable lever carrying a latching tooth structure, a foot rest mounted stationarily to the rear of said lever and carrying a horizontal shaft substantially in parallelism with the axis of lever oscillation; a pawl mounted at its rear end on said shaft and having a forward latching end directly behind said lever and swingable into engagement with said tooth structure; and spring means also mounted on said shaft and engageable with said pawl with a normal tendency to retract the latter from latching engagement.

5. In claim 4, said spring means having tensioned elements reacting between said pawl and said foot rest, whereby said pawl and spring means are mountable on and detachable from said shaft as a unit structure.

6. In claim 4, a stop means carried by said pawl for engagement with said foot rest to limit the retracting action of said spring means.

7. In combination with a brake pedal of the type that carries a set of teeth for latching purposes, a pivotal pawl comprising a substantially flat plate having a latching extremity, said plate having a smoothly inclined and rigidly united superstructure upon which the heel of an operator's shoe may slide toward the pedal as the latter is depressed.

8. In claim 7, said pawl having a stop member rigidly secured thereto between its pivotal axis and said latching extremity.

9. A mechanism of the class described, comprising, in association with a vehicle floor and a foot-operable brake lever projecting upwardly therethrough and carrying a pad, the lever having a rearwardly facing tooth structure: an elevated foot-rest stationarily mounted above the floor to the rear of said lever, and carrying a transverse shaft one end of which terminates adjacent an outer side of said foot-rest; and a latching mechanism slidable onto said one end of said shaft to form a compact and unitarily heel-operable device; said mechanism comprising an elongated plate-like pawl having one end pivoted on said shaft, and its other end shaped for complemental engagement with said tooth structure.

10. In claim 9, said pawl having an integral, upwardly and forwardly inclined superstructure so disposed that the operator's heel may rest and slide thereon while the ball or toe of the same foot bears against the lever pad.

References Cited in the file of this patent

UNITED STATES PATENTS

| 418,661 | Trequrtha | Dec. 31, 1889 |
| 1,103,038 | Clemens | July 14, 1914 |
| 1,302,112 | Wilkins | Apr. 29, 1919 |
| 1,447,908 | Staude | Mar. 6, 1923 |
| 1,966,551 | Howard | July 17, 1934 |
| 2,053,495 | Ranlett | Sept. 8, 1936 |
| 2,399,835 | Stoner | May 7, 1946 |
| 2,463,657 | Thompson | Mar. 8, 1948 |
| 2,483,224 | Narcovich | Sept. 27, 1949 |
| 2,535,718 | Bintz | Dec. 26, 1950 |

FOREIGN PATENTS

| 471,127 | Germany | Jan. 17, 1929 |